US010453136B2

(12) United States Patent
Manukyan et al.

(10) Patent No.: US 10,453,136 B2
(45) Date of Patent: Oct. 22, 2019

(54) SHARED MEMORY-BASED TRANSACTION PROCESSING

(71) Applicant: StreamingEdge Inc., New York, NY (US)

(72) Inventors: Jacques Agop Manukyan, New York, NY (US); Wilson Ejike Nweke, Jersey City, NJ (US)

(73) Assignee: STREAMINGEDGE INC., New York, NY (US)

( * ) Notice: Subject to any disclaimer, the term of this patent is extended or adjusted under 35 U.S.C. 154(b) by 584 days.

(21) Appl. No.: 15/164,393

(22) Filed: May 25, 2016

(65) Prior Publication Data

US 2017/0345094 A1    Nov. 30, 2017

(51) Int. Cl.
G06Q 40/04    (2012.01)
H04L 29/06    (2006.01)
G06F 16/23    (2019.01)

(52) U.S. Cl.
CPC ......... G06Q 40/04 (2013.01); G06F 16/2336 (2019.01); H04L 65/102 (2013.01)

(58) Field of Classification Search
CPC .............................. G06Q 9/466; G06Q 40/04
USPC .......................................................... 705/37
See application file for complete search history.

(56) References Cited

U.S. PATENT DOCUMENTS

| | | |
|---|---|---|
| 2002/0133455 A1 | 9/2002 | Howorka et al. |
| 2009/0055303 A1 | 2/2009 | Callaway et al. |
| 2015/0127509 A1 | 5/2015 | Studnitzer et al. |
| 2016/0104242 A1 | 4/2016 | Melton |

FOREIGN PATENT DOCUMENTS

| | | |
|---|---|---|
| EP | 0 512 702 A2 | 11/1992 |
| WO | WO 93/15467 A1 | 8/1993 |

OTHER PUBLICATIONS

International Search Report and Written Opinion dated Aug. 21, 2017 in corresponding International Application No. PCT/US2017/032458.
Edwin D. Reilly, "Computer Memory," Concise Encyclopedia of Computer Science, Sep. 3, 2004, p. 504.
Eric Long, et al., "SymmetricDS User Guide," retrieved from the Internet: URL:https://www.symmetricds.org/doc/3.6/user-guide/pdf/user-guide.pdf [retrieved on Aug. 8, 2017], Sep. 28, 2014, pp. 1-164.

(Continued)

*Primary Examiner* — Lindsay M Maguire
(74) *Attorney, Agent, or Firm* — Ostrolenk Faber LLP

(57) ABSTRACT

Described is a method for updating a first computer memory of a first transaction engine that processes transactions of a first topic and a second computer memory of a second transaction engine that processes transactions of a second topic different from the first topic but the transactions involving or updating a common factor. After the first transaction engine processes the transaction, it notifies a separate process affiliated or associated with each of the remaining transaction engines of the execution of the transaction. Each such associated process updates a local shared memory that it shares with the respective transaction engine. A memory master may also be notified of the transactions and their completion and the memory master may maintain state information. In a stock market or other electronically-implemented exchange or bourse context, the transactions may be orders for matching engines in an order book.

19 Claims, 17 Drawing Sheets

(56) References Cited

OTHER PUBLICATIONS

International Preliminary Report on Patentability dated Dec. 6, 2018 containing the Written Opinion of the International Searching Authority in corresponding International Application No. PCT/US2017/032458.

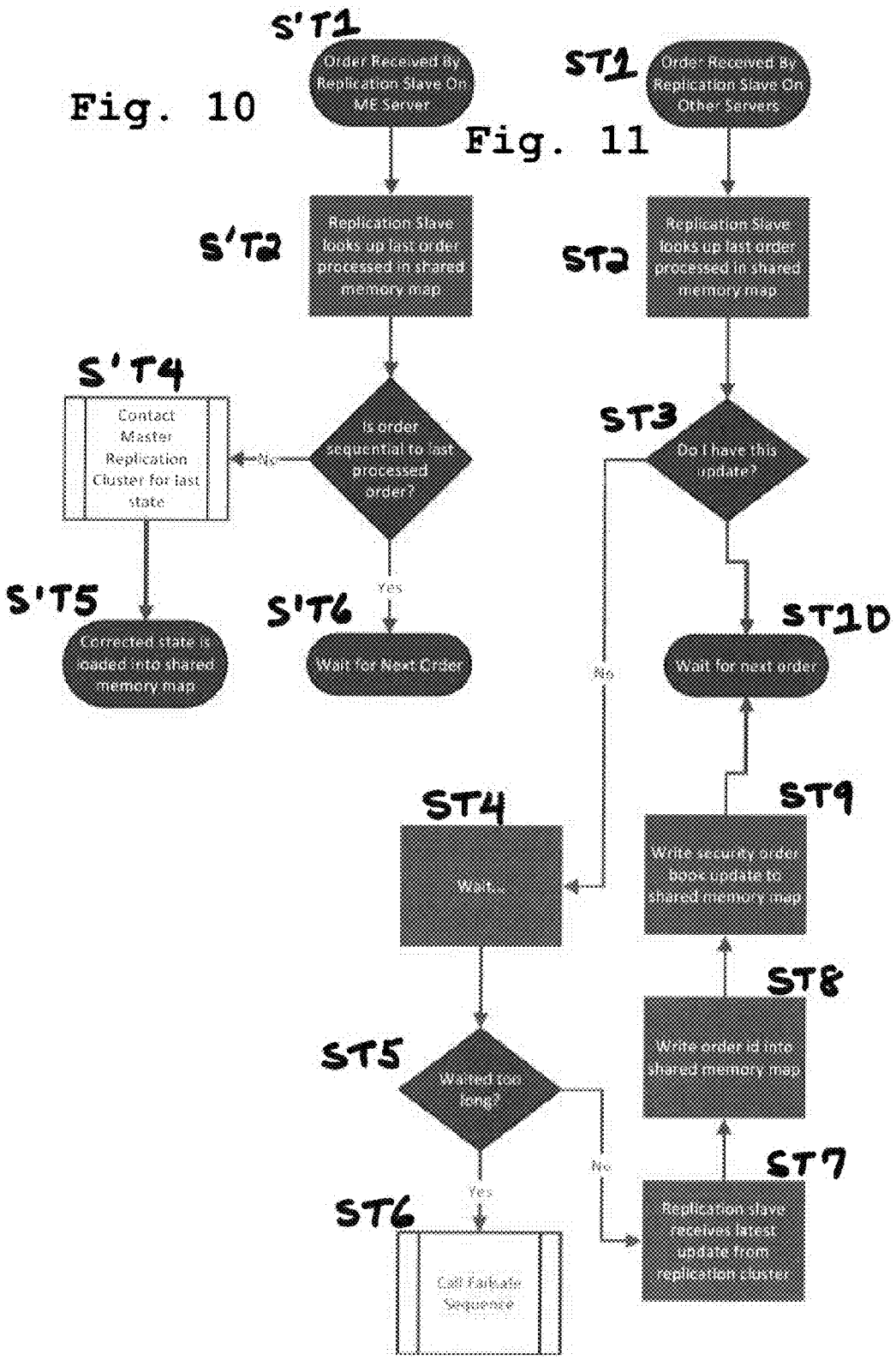

Fig. 14

| | Gateway (20) | Transaction Engine 1 (30) | Memory Slave Controller 1 (40) | Memory Slave Controller 2 (60) | Master (70) |
|---|---|---|---|---|---|
| Start up | Load configuration | Find management server | | Receive from master the states of the master | Build topology map |
| | Load transaction engine mappings | Load configuration and mapping | | Built topology map based on the received information | Become Primary Master |
| | | | Create shared memory map with transaction engine 1 | Register with the master | Load Latest states from all masters and memory slave controllers |
| | Create memory map of transaction engine addresses and topics/channels (which transaction engine processes what types of orders) | | Send multitask announcement (advertised) that memory slave controller 1 is ready for new orders/transactions | | |
| Transaction processing | Validate order | Validate order | Receive order | Order received from gateway multitask | Receive order |
| | Multitask order to the proper transaction engine and all memory slaves and the masters | Is order sequential? If no: go to failsafe and master supplies missing sequence | Look up last order processed in Transaction Engine 1 in the shared memory map | Look up last order processed in shared memory map | Wait for Transaction Engine to send execution report |
| | | If yes, place order/transaction in Order Book | If order is out of sequence: contact master | Do I have this update? | If too long of a wait, then take remedial action |
| | | Generate trade | If order is in sequence: wait for next order (no need to update shared memory because Transaction Engine already updated the shared memory map) | If no: wait for confirmation, which includes order ID, trade generated and other information | Receive Execution Report from Transaction Engine |
| | | Send execution report on multitask channel | | Write order ID into shared memory map | Disseminate update to other data centers (if any) |
| | | Write order ID in shared memory map and update Order Book | | Update Order Book | Record state update |

SHARED MEMORY-BASED TRANSACTION PROCESSING

FIELD OF THE INVENTION

The present disclosure relates to the field of real time processing of transactions that involve or are contingent on a common factor and, in particular, to order book processing via a set of automated processors to minimize latency and mutual blocking of computer memory resources.

BACKGROUND OF THE INVENTION

Computer systems that provide sufficient throughput for high-volume real time processing of transactions, such as order book transactions in financial market systems, pose challenges for system architects and software engineers. For example, in electronic financial markets, a matching engine performs order book processing of a received transaction or order. In particular, an order is received and the matching engine determines the price at which the order is to be matched (for example, sold or purchased). The order book is a list of orders that records the interests of buyers and sellers for a particular financial instrument, such as a symbol being traded, a commodity, a derivative or the like (security). The matching engine uses the order book to match and to fulfill the incoming orders. These matched orders become trades when matched. Each market may have its own matching rules and order types which determine how they are matched.

One set of important related constraints is that the order book transactions must be performed linearly (sequentially) and may need to update a common resource, for example, memory resources, thus temporarily blocking the resource. As orders are inserted, updated or removed into an order book, a memory space implementing the order book is locked until a change is complete. Such atomization of transactions may guarantee that data is inserted, updated or removed properly and completely, and that the action is not overridden by another transaction.

A further wrinkle is that a credit profile must often be applied to control the amount of liability, risk or exposure of a user, such as an institution, individual or other party that submits orders for traders. The credit profile may include one or more credit limits, for example, for an investor, such as an institution, fund manager, or other investing or trading party, that are set by the investor party or by another institution, such as a market, exchange, bourse, sector or venue administration, and are used by the matching engines to control risk or exposure for the institution for the given market, industry or regional sector, or the like. A credit limit may be set using multiple market rules. It can be set based on a per security basis, on a per market basis, on a per sector, industry or other sub-market or investment strategy basis, or the like or based on a combination of the foregoing. Further, a credit limit may be set across a platform or a venue encompassing multiple market types.

A first approach for implementing a credit profile is that each security has its own credit limits, which are not shared across securities or with other markets within the venue. FIG. 2 illustrates such a centralized scenario, in which the matching engine itself can run one or more order books. Each security requires an order book, and the matching engine itself maintains and checks the credit limits internally.

Such a matching engine would have an interface that receives both orders for the order book and credit limit updates for the institution. When an order is submitted to the matching engine, the matching engine may determine whether it is accepted. That is, during the order book matching process, the credit limit is checked to determine whether the order can be traded. This process is done internally within the matching engine itself. If based on the currently available credit limit(s) the order is deemed acceptable, then the order is placed in the order book. Similarly, if a credit limit update is received by the matching engine, for example, an increase in daily limit for a client or a particular institution for a specific security or for a specific market, then the matching engine updates its internal credit limits.

A problem with using such a method is that if there are more than one matching engines within a market or within a venue, then two separate credit pools exist and the credit may become fragmented. For example, consider a relatively straightforward scenario in which there are two matching engines with four securities as shown in the chart below:

| Matching Engine 1 | Matching Engine 2 |
|---|---|
| Security 1 | Security 3 |
| Security 2 | Security 4 |
| Credit Pool 1 | Credit Pool 2 |

Each matching engine would have its own credit pool for the given institution. Matching Engine 1 would have a credit pool that covers only Securities 1 and 2, whereas Matching Engine 2 would have a credit pool that covers only Securities 3 and 4 for the institution. Thus, the institution would have no ability to set a single credit limit to encompass all four securities being traded at the same time since the credit is fragmented across the various matching engines.

A second method is to centralize processing for the credit limits, to address these problems. As illustrated in FIG. 3, credit processing is centralized in a centralized credit engine that is run with one or more credit pools based on client requirements or configuration requirements. A matching engine or transaction engine may query a central location for credit during its order book matching process. Thus, as each order is updated to an order book, a centralized credit approach may query a central location to determine whether credit is available (i.e., whether the current order would exceed the pre-set credit limit) for the order being processed. Then, during the order book matching process, each matching engine connects to the centralized credit engine to query whether credit is available. The centralized credit approach guarantees that there is no credit leak within the market or venue, and that the user has no exposure that exceeds the credit limit that has been set.

A problem with this approach is that since order book transactions are linear (or sequential), memory resources of the centralized credit engine would be blocked by a first process while a second process has to wait. Thus, since Matching Engine 2 must wait for processing performed by a centralized credit engine on behalf of Matching Engine 1, latency is added for the system since the centralized credit engine processor and memory are being used for an order being processed for Matching Engine 1. However, such a system prevents credit leak within the market or venue, and the user is guaranteed to have no exposure over the credit limit that has been set. For example, consider the following chart, in which a user has two orders in the venue as follows:

| Order 1 | Order 2 |
| --- | --- |
| Buy 10 million units of Security 1 at price 10 | Buy 10 million units of Security 6 at price 10 |

Assuming that sufficient sell orders are available on the venue at the moment to fulfill the above two buy orders, and thus that the matching engines can perform the order processing, the user would then have bought 10 million shares each of Security 1 and Security 6. However, assuming that the user requests to have a credit limit set of 15 million units on the venue (that is, the user, for example, an institution, sets a credit limit of 15 million units globally for the venue), the centralized credit engine would maintain such a credit limit for the user. When the orders are submitted to the market starting with order book Security 1, the following steps would take place:

1. Order 1 goes to matching engine 1.
2. Matching engine 1's security 1 order book is locked and the order is placed in the order book.
3. Matching engine 1 runs its matching algorithm. During the executing of the matching algorithm, the matching engine 1 determines that a trade can happen.
4. Matching engine 1 connects out to the credit engine.
5. Credit engine receives the request to check credit on the tradable order. Credit engine locks its credit pool.
6. Credit engine determines whether the trade can happen. Credit engine updates its credit limit to 10 mm used and responds to matching engine 1 that the trade can proceed.
7. Credit engine unlocks its credit pool.
8. Matching engine 1 creates a trade and removes the matching orders from the order book.
9. Matching engine 1 unlocks its order book for security 1.
10. Order 2 goes to matching engine 2.
11. Matching engine 2's security 6 order book is locked and the order is placed in the order book.
12. Matching engine 2 runs its matching algorithm. During the executing of the matching algorithm, matching engine 2 determines that a trade can proceed.
13. Matching engine 2 connects out to the credit engine.
14. Credit engine receives the request to check credit on the tradable order. Credit engine locks its credit pool.
15. Credit engine determines whether the trade can be allowed. Credit engine determines that only 5 mm can be used for the user (as limit is 15 mm, and 10 mm is already used). Credit engine updates its credit limit to 15 mm used and responds to matching engine 2 that the trade can proceed only for 5 mm.
16. Credit engine unlocks its credit pool.
17. Matching engine 2 creates a trade for 5 mm and leaves the other 5 mm open. It also removes the matching orders from the order book.
18. Matching engine 2 unlocks its order book for security 6.

Thus, a disadvantage of this centralized model is that latency is introduced by the checking and updating of the centralized credit available for each order at the central credit engine. For each order, the memory of the central credit engine must be queried to determine the available credit limit, and if an order is executed, then the memory must be updated. Writing to computer memory takes longer than computer processing that does not entail memory updates. While this check is occurring for an order for a first matching engine, the remaining matching engines must wait with its order book updates because the centralized credit locks itself or at least locks a computer memory resource thereof, until the first transaction is complete.

SUMMARY OF THE INVENTION

A method, means for implementing the method, a device, a non-transitory computer-readable medium, and a system are disclosed for updating a first computer memory of a first transaction engine configured to process transactions of a first topic and a second computer memory of a second transaction engine configured to process transactions of a second topic different from the first topic. Such a method includes:

receiving, by an order processor of the first transaction engine, a first transaction request of the first topic, processing, by the order processor of the first transaction engine, the first transaction request to yield a processed first transaction and, based on the processed first transaction, updating, by the order processor of the first transaction engine, the first computer memory, according to a first shared computer memory map of the first computer memory;

receiving, by a memory slave controller of the second transaction engine, the first transaction request, waiting, by the memory slave controller of the second transaction engine, for receipt of confirmation of the processed first transaction from the order processor of the first transaction engine, and updating, by the memory slave controller of the second transaction engine, according to the processed first transaction, the second computer memory, according to a second shared computer memory map of the second computer memory;

receiving, by an order processor of the second transaction engine, a second transaction request of the second topic, processing, by the order processor of the second transaction engine, the second transaction request to yield a processed second transaction and, based on the processed second transaction, updating, by the order processor of the second transaction engine, the second computer memory, according to the second shared computer memory map of the second computer memory;

receiving, by a memory slave controller of the first transaction engine, the second transaction request, waiting, by the memory slave controller of the first transaction engine, for receipt of confirmation of the processed second transaction received from the order processor of the second transaction engine, and updating, by the memory slave controller of the first transaction engine, according to the processed second transaction, the first computer memory, according to the first shared computer memory map of the first computer memory.

In such a method, the first transaction engine may be implemented on a first automated data processor, and the second transaction engine may be implemented on a second automated data processor different from the first automated data processor.

In such a method, the memory slave controller of the first transaction engine may provide no direct notification to the order processor of the first transaction engine regarding the update to the first computer memory, and the memory slave controller of the second transaction engine may provide no direct notification to the order processor of the second transaction engine regarding the update to the second computer memory This method may further include, prior to performing other recited steps:

generating, by a configuration manager of the first transaction engine, the first shared computer memory map of the first computer memory;

generating, by a configuration manager of the second transaction engine, the second shared computer memory map of the second computer memory.

This method may further include, prior to performing other recited steps:

generating, by the memory slave controller of the first transaction engine, the first shared computer memory map of the first computer memory;

generating, by the memory slave controller of the second transaction engine, the second shared computer memory map of the second computer memory.

In such a method, the confirmation of the processed first transaction may include an order ID associated with the first transaction request and trade data associated with the confirmation of the processed first transaction.

Such a method may further include:

based on the processed first transaction, transmitting, by the order processor of the first transaction engine, an execution report, to a plurality of memory slave controllers.

Such a method may further include:

receiving, by a gateway processor, the first and second transaction requests;

first identifying the first transaction request as being associated with the first topic;

according to the identifying, transmitting the first transaction request to the order processor of the first transaction processor;

transmitting the first transmission request to a plurality of memory slave controllers including the memory slave controller of the second transaction engine;

second identifying the second transaction request as being associated with the second topic;

according to the second identifying, transmitting the second transaction request to the order processor of the second transaction processor; and transmitting the second transmission request to the plurality of memory slave controllers including the memory slave controller of the first transaction engine.

Such a method may further include:

transmitting the first transmission request to a memory master processor; and transmitting the second transmission request to the memory master processor, wherein the first transaction engine is implemented on a first automated data processor, the second transaction engine is implemented on a second automated data processor different from the first automated data processor, and the memory master processor is implemented on a third automated data processor different from the first and second automated data processors.

Also, this method may comprise:

receiving, by the memory master processor, the first and second transmission requests;

updating a master memory, by the memory master processor, according to the confirmation of the processed first transaction received from the order processor of the first transaction engine and the confirmation of the processed second transaction received from the order processor of the second transaction engine.

A system as described for updating a first computer memory of a first transaction engine configured to process transactions of a first topic and a second computer memory of a second transaction engine configured to process transactions of a second topic different from the first topic, may include:

the first transaction engine implemented on a first automated data processor and comprising:

an order processor configured to receive a first transaction request of the first topic, and to process the first transaction request to yield a processed first transaction;

a shared memory controller configured to update, based on the processed first transaction, the first computer memory, according to a first shared computer memory map of the first computer memory; and an execution report generator configured to transmit, based on the processed first transaction, an execution report, to a plurality of memory slave controllers including the memory slave controller of the second transaction engine;

a memory slave controller of the second transaction engine comprising:

an order receiver configured to receive the first transaction request;

a transaction engine interface configured to wait for receipt of confirmation of the processed first transaction from the order processor of the first transaction engine; and a shared memory manager configured to update, according to the processed first transaction, the second computer memory, according to a second shared computer memory map of the second computer memory;

the second transaction engine implemented on a second automated data processor different from the first automated data processor and comprising:

an order processor configured to receive a second transaction request of the second topic, and to process the second transaction request to yield a processed second transaction;

a shared memory controller configured to update, based on the processed second transaction, the second computer memory, according to the second shared computer memory map of the second computer memory; and the first transaction engine comprising:

a memory slave controller configured to receive the second transaction request;

a transaction engine interface configured to wait for receipt of confirmation of the processed second transaction received from the the second transaction engine; and a shared memory manager configured to update, according to the processed second transaction, the first computer memory, according to the first shared computer memory map of the first computer memory.

In such a system, the memory slave controller of the first transaction engine may provide no direct notification to the order processor of the first transaction engine regarding the update to the first computer memory, and the memory slave controller of the second transaction engine may provide no direct notification to the order processor of the second transaction engine regarding the update to the second computer memory In such a system, the first transaction engine may further comprise:

a configuration manager configured to generate, prior to receiving a transaction request by the first transaction engine, the first shared computer memory map of the first computer memory; and the second transaction engine further comprises:

a configuration manager configured to generate, prior to receiving a transaction request by the second transaction engine, the second shared computer memory map of the second computer memory.

In such a system, the memory slave controller of the first transaction engine further may comprise a shared memory creator configured to generate, prior to receiving a transaction request, the first shared computer memory map of the first computer memory; and the memory slave controller of the second transaction engine may further comprise a shared memory creator configured to generate, prior to receiving a transaction request, the second shared computer memory map of the second computer memory.

In such a system, the confirmation of the processed first transaction may comprise an order ID associated with the first transaction request and trade data associated with the confirmation of the processed first transaction.

Such a second transaction engine may further comprise:

an execution report generator configured to transmit, based on the processed second transaction, an execution report, to a plurality of memory slave controllers including the memory slave controller of the first transaction engine;

Such a system may further comprise a gateway processor comprising:

an order validator configured to receive the first and second transaction requests;

a transaction topic processor configured to identify the first transaction request as being associated with the first topic and the second transaction request as being associated with the second topic;

a transaction engine interface configured to transmit, according to the identifying, the first transaction request to the first transaction processor and the second transaction request to the second transaction processor;

a slave and master broadcaster configured to transmit the first transmission request to a plurality of memory slave controllers including the memory slave controller of the second transaction engine; and the slave and master broadcaster configured transmit the second transmission request to the plurality of memory slave controllers including the memory slave controller of the first transaction engine.

The first and second transaction requests may be orders, and the processing of the first transaction request and the processing of the second transaction request may each entail matching the requests in respective order books for an electronic exchange for market-traded items.

Such a system may further comprise:

a memory master processor comprising a gateway interface configured to receive the first transaction request and the second transaction request;

a transaction engine interface configured to receive the confirmation of the processed first transaction and the confirmation of the processed second transaction; and a controller configured to update a master memory according to the confirmation of the processed first transaction and the confirmation of the processed second transaction, wherein the memory master processor is implemented on a third automated data processor different from the first and second automated data processors.

Other features and advantages of the present invention will become apparent from the following description of the invention which refers to the accompanying drawings.

BRIEF DESCRIPTION OF THE DRAWINGS

FIG. 10 is a process flow diagram illustrating an example of a process for a memory slave controller sharing a common memory resource with the first transaction engine, when receiving an order, according to an aspect of the present disclosure.

FIG. 11 is a process flow diagram illustrating an example of a second memory slave controller sharing a common memory resource with a second transaction engine when receiving the order, according to an aspect of the present disclosure.

FIG. 14 is a chart illustrating an overview of an example of major processing events for various components of the system, according to an aspect of the present disclosure.

DETAILED DESCRIPTION OF PREFERRED EMBODIMENTS OF THE INVENTION

As each order is processed by a transaction engine, information about the transaction is transmitted by the transaction engine to a downstream system, such as an archiving server or gateway, and this information is monitored by memory slave controllers. Each memory slave controller shares a respective common memory with a transaction engine. Thus, after a transaction engine 1 (30)

records the order in its order book, and may execute a trade in accordance with the order, memory slave controllers associated with the remaining transaction engines get notification of the completion of the order. Each of these remaining memory slave controllers updates a common memory resource that it shares with its respective matching engine. In this way, the memory resources used by each of the remaining matching engines is updated, even without active participation of the remaining transaction engines. According to this approach, each matching engine maintains its copy or version of the available credit pool. However, each transaction engine need not concern itself with updating credit limits of a credit profile of an investing party or the like, in response to an external modification of a global credit limit or in response to orders that are processed.

Thus, when a user decides that he or she wishes to raise an overall credit limit, in contrast with the first related art approach, which would send the update to the transaction engine so it could update its internal credit pool, and in contrast with the centralized credit approach of the related art, which would update a central credit pool by a centralized credit engine, the update is done inside the credit engine within the transaction engine. However, the update is not performed by the transaction engine process itself. Instead, the update may be performed by an external memory slave controller or credit routing engine that is associated with the transaction engine. In this way, the process may be simplified and sped up since the transaction engine need not take time to apply external changes to the credit pool. Accordingly, each transaction engine can maintain identical credit limit information and can update the credit information individually without knowing that another transaction engine exists and updates the credit information. Thus, real time throughput processing can be improved, since no external queries are necessary for the transaction engine to validate the credit limit, and this is implemented in a way that is transparent to the transaction engine.

Figure 1:
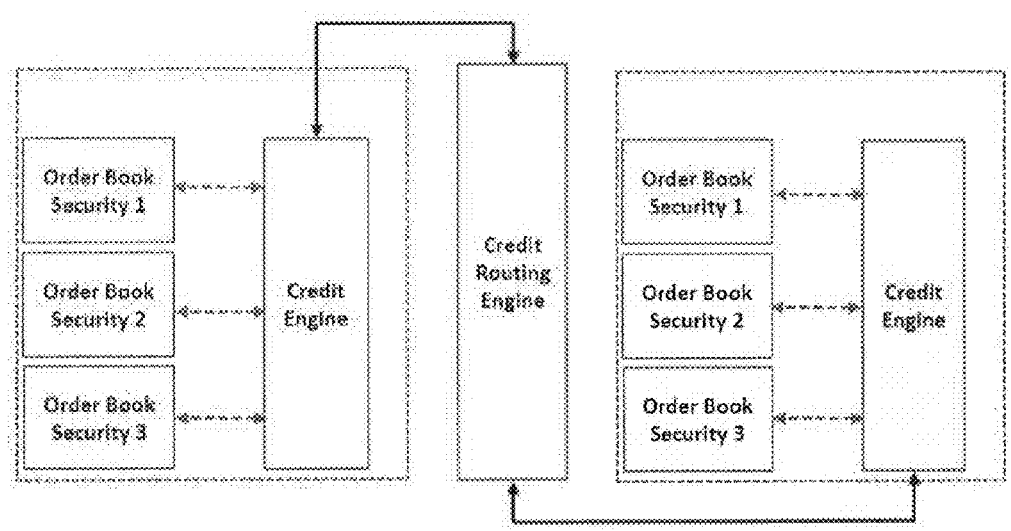
FIG. 1 illustrates an example of an overview of a system according to an aspect of the present disclosure.
Figure 2:
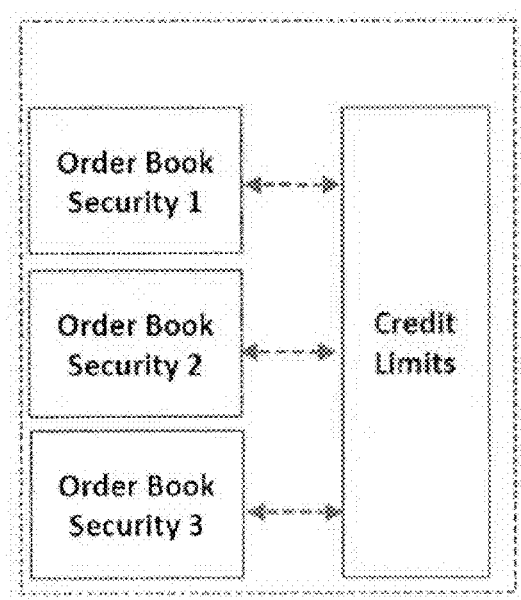
FIG. 2 is an illustration of an example of a credit limit system, according to the related art.
Figure 3:
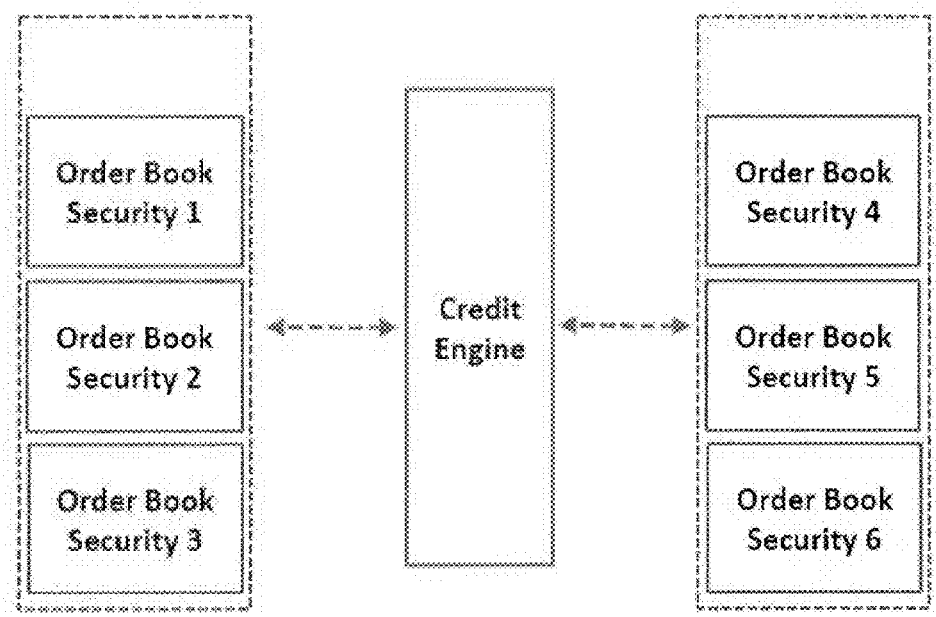
FIG. 3 is an illustration of another example of a centralized credit limit approach, according to the related art.
Figure 4:
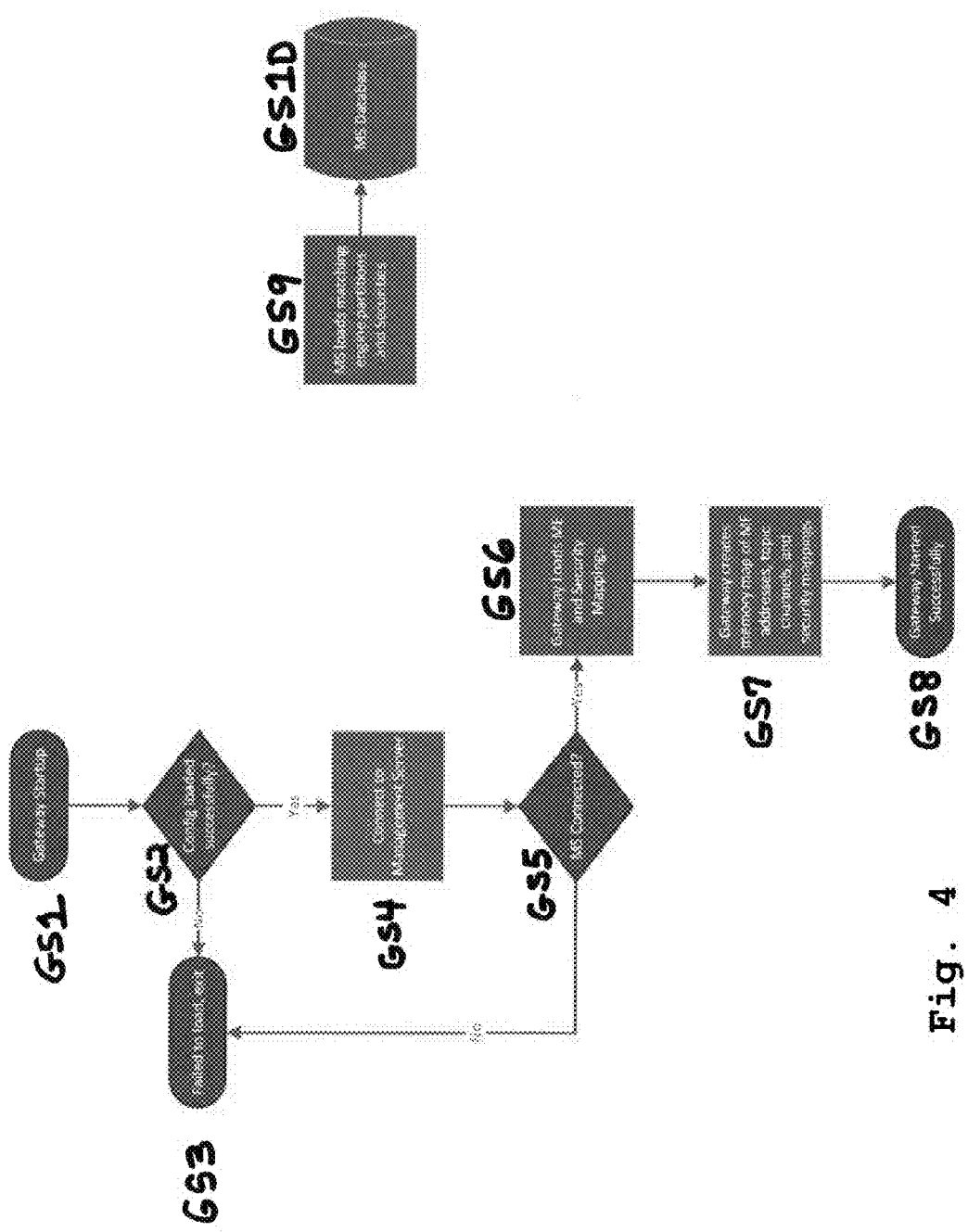
FIG. 4 is a process flow diagram illustrating an example of a process performed by a gateway upon startup, according to an aspect of the present disclosure.
Figure 5:
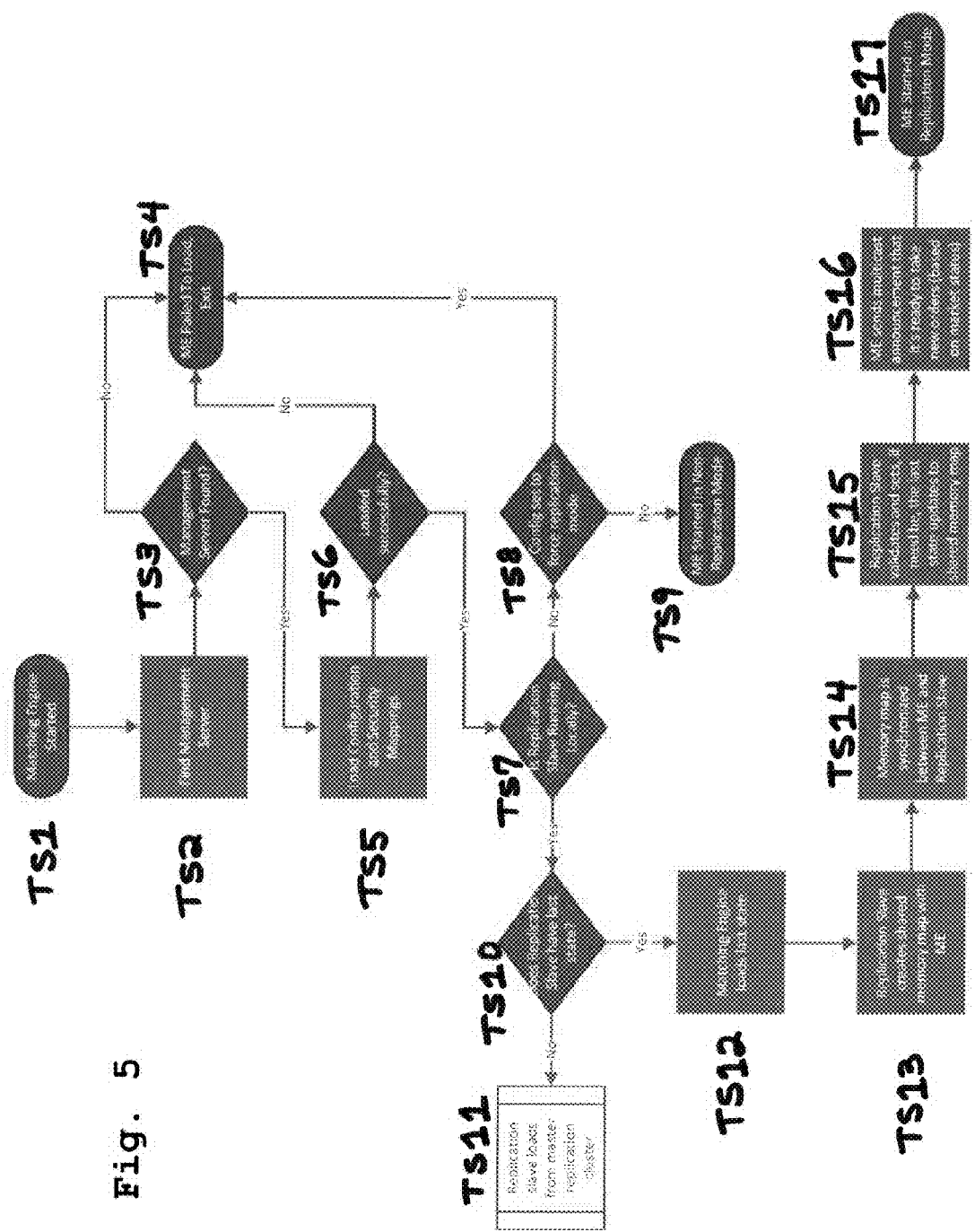
FIG. 5 is a process flow diagram illustrating an example of a transaction engine startup process, according to an aspect of the present disclosure.
Figure 16:
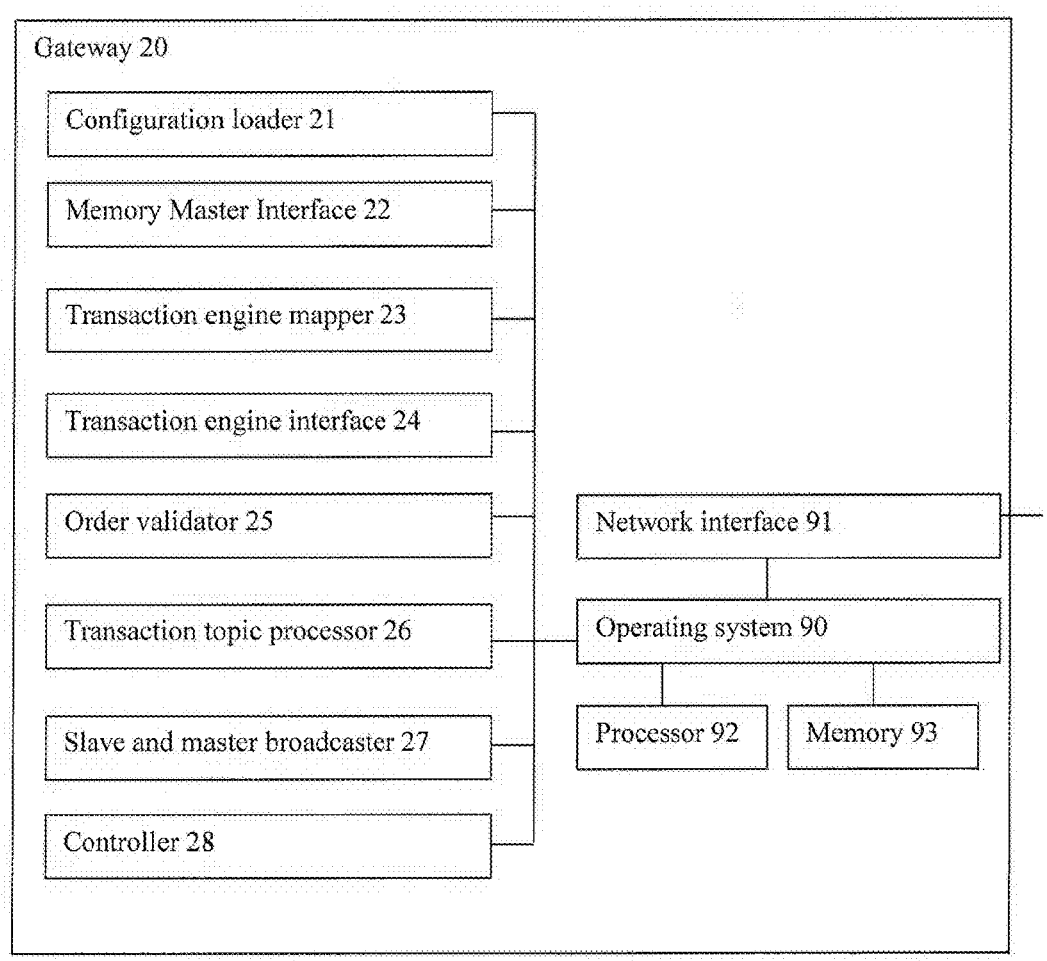
FIG. 16 is a schematic illustration illustrating an example of a gateway that receives transaction requests and transmits them to the appropriate transaction engines, according to an aspect of the present disclosure.
Figure 17:
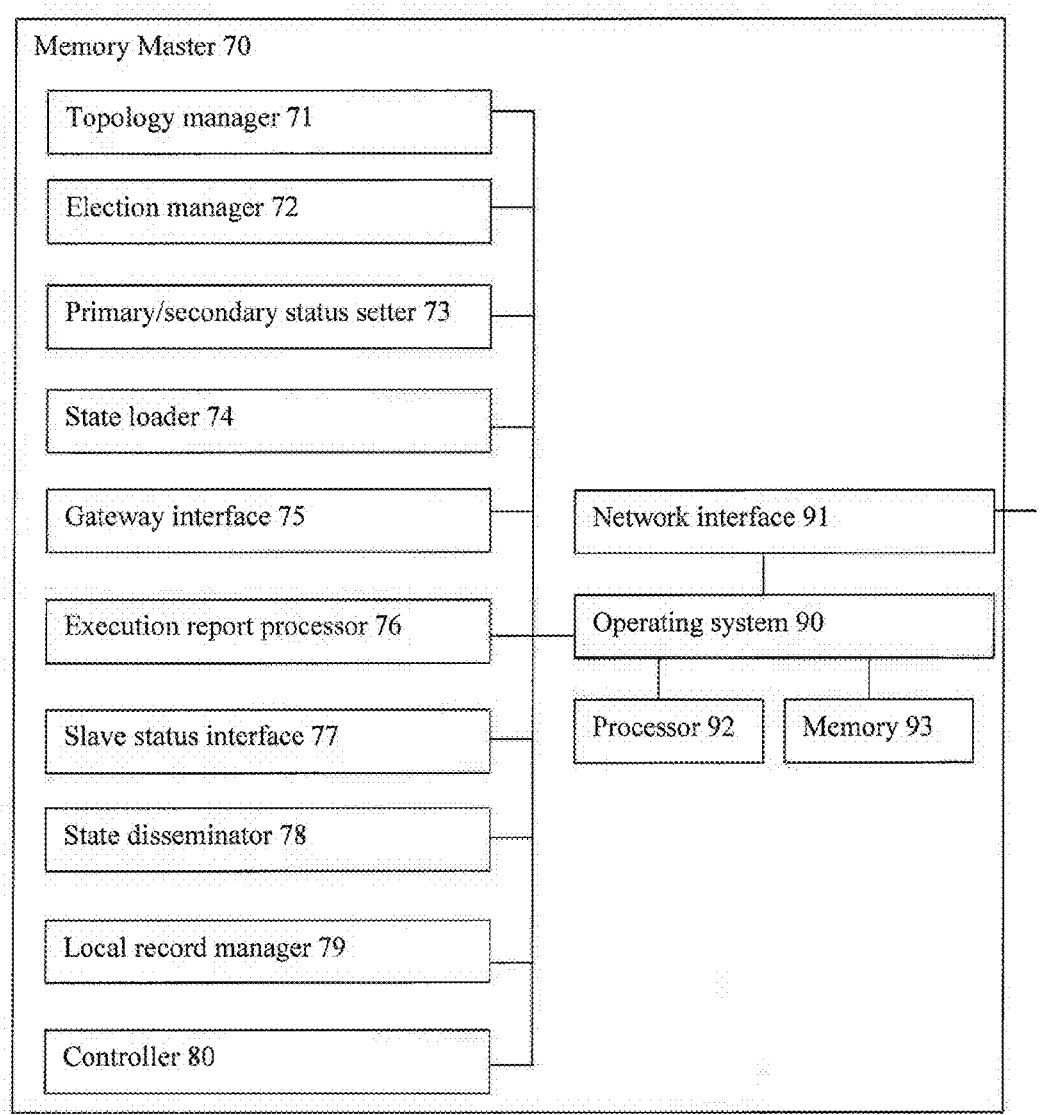
FIG. 17 is a schematic illustration illustrating a memory master that maintains state information for relevant components, according to an aspect of the present disclosure.

As illustrated in FIGS. 4, 14 and 16, gateway 20 that will receive orders for a market, sector or venue or the like, upon startup loads configuration information and loads transaction engine mappings to create a memory map of transaction engine addresses and topics/channels which control which transaction engine process receives what types of orders. For example, each transaction engine may be associated with a particular topic or channel, which covers one or more symbols, such as equities or other securities for which that transaction engine executes trades. It will be understood that such securities may include one or more bonds or bond funds, ETFs, derivatives, funds, portfolios that cover a range of securities, or other market-traded items or vehicles, foreign currency exchange-traded items, such as foreign currencies or foreign currency funds, or a combination of the foregoing.

Configuration information for gateway 20, such as IP address, port and identifying information, and the like, as well as for other components of the system, may be obtained upon start up from a centralized management server (not shown). When the component starts, it receives all configuration information, or a portion thereof, about itself, as well as the topology of the platform information from the management server. However, such a management server is not required for all embodiments of the present disclosure. For example, each component could have configuration files that list such information.

Transaction engines may sometimes be described herein as matching engines, and memory slave controllers may sometimes be described herein as replication slaves. A master may be sometimes referred to as a replication server or as a replication or as a primary replication master. It will be understood that while many of the examples provided in the present disclosure refer to an order book and to the execution of trades associated with a transaction in the context of electronic exchange-traded items, such as securities, and the like, a range of other types of transactions is also contemplated.

Figure 7:
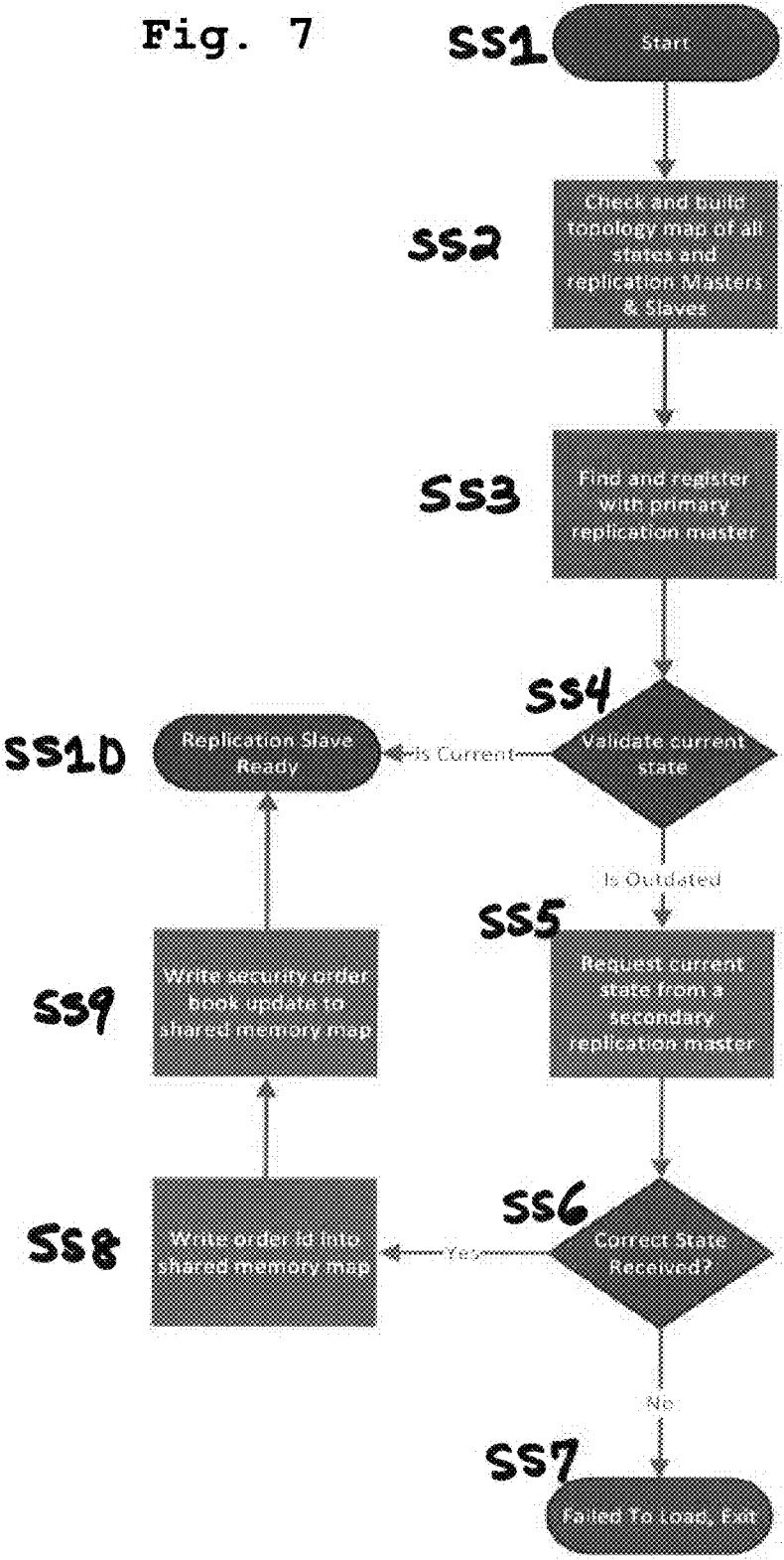
FIG. 7 is a process flow diagram illustrating an example of a startup process for a memory slave controller, according to an aspect of the present disclosure.

Also, at startup, shared memory creator 41 of each memory slave controller 40 (illustrated in FIG. 15B) creates a shared memory map that is shared with the transaction engine 30 with which it is affiliated or associated, as illustrated in FIGS. 7 and 14. For example, transaction engine 1 (30) and memory slave controller 1 (40) may be executed on a same device, such as a computer server, or may be executed on separate devices but have access to a shared memory resource, such as a database. Memory slave controller 40 may then also create a mapping or addressing for the primary master 70 and any secondary masters and for the other memory slave controllers 40, as illustrated at SS2 of FIG. 7. If the current state of addressing other resources is out of date, such a state can be requested from and received from the secondary replication master.

State information may be obtained from the secondary replication master so as to avoid burdening the primary replication master, however it will be understood that such information may be obtained from the primary replication master, or, according to another aspect of the present disclosure, some of the information may be obtained from the primary replication master while some such information may be obtained from one or more secondary replication masters. According to another embodiment, some memory slave controllers may obtain such information from the primary replication master, while other memory slave controllers may obtain such information from one or more secondary replication masters.

Memory slave controller 1 (40), may announce to memory master 70 its status as memory slave controller 1 (40) associated with transaction engine 1 (30) and that it is ready for a new order/transaction, as illustrated at SS3 of FIG. 7. Then, the correct state information is retrieved and written into memory and the replication slave is ready for processing.

Figure 8:
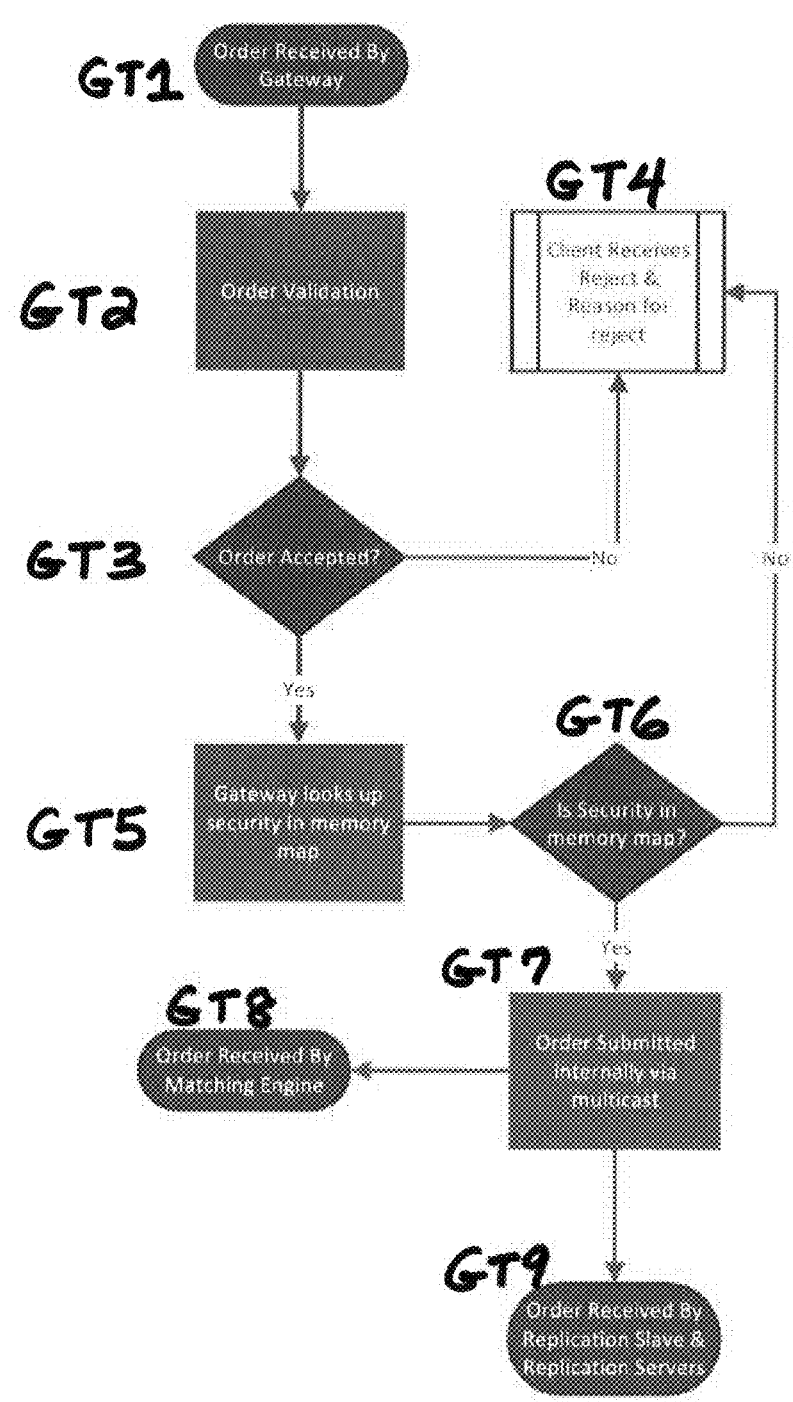
FIG. 8 is a process flow diagram illustrating an example of a process flow for processing an order received by the gateway, according to an aspect of the present disclosure.

As further illustrated in FIGS. 8 and 14, when gateway 20 receives a transaction or order at a time of transaction processing, the order is validated, and if it is a valid order, gateway 20 looks up, for example, in a look up table (LUT) or other database the security referred to in the order to determine the topic or channel, and thus, to determine to which transaction engine 40 the order pertains, as illustrated, for example, at GT5 of FIG. 8. Then, according to the topic/channel, the order is transmitted at GT7 and is received at GT8 by the transaction engine to which the order pertains and by all of the replications slave controllers 40 and the master 70.

Figure 9:
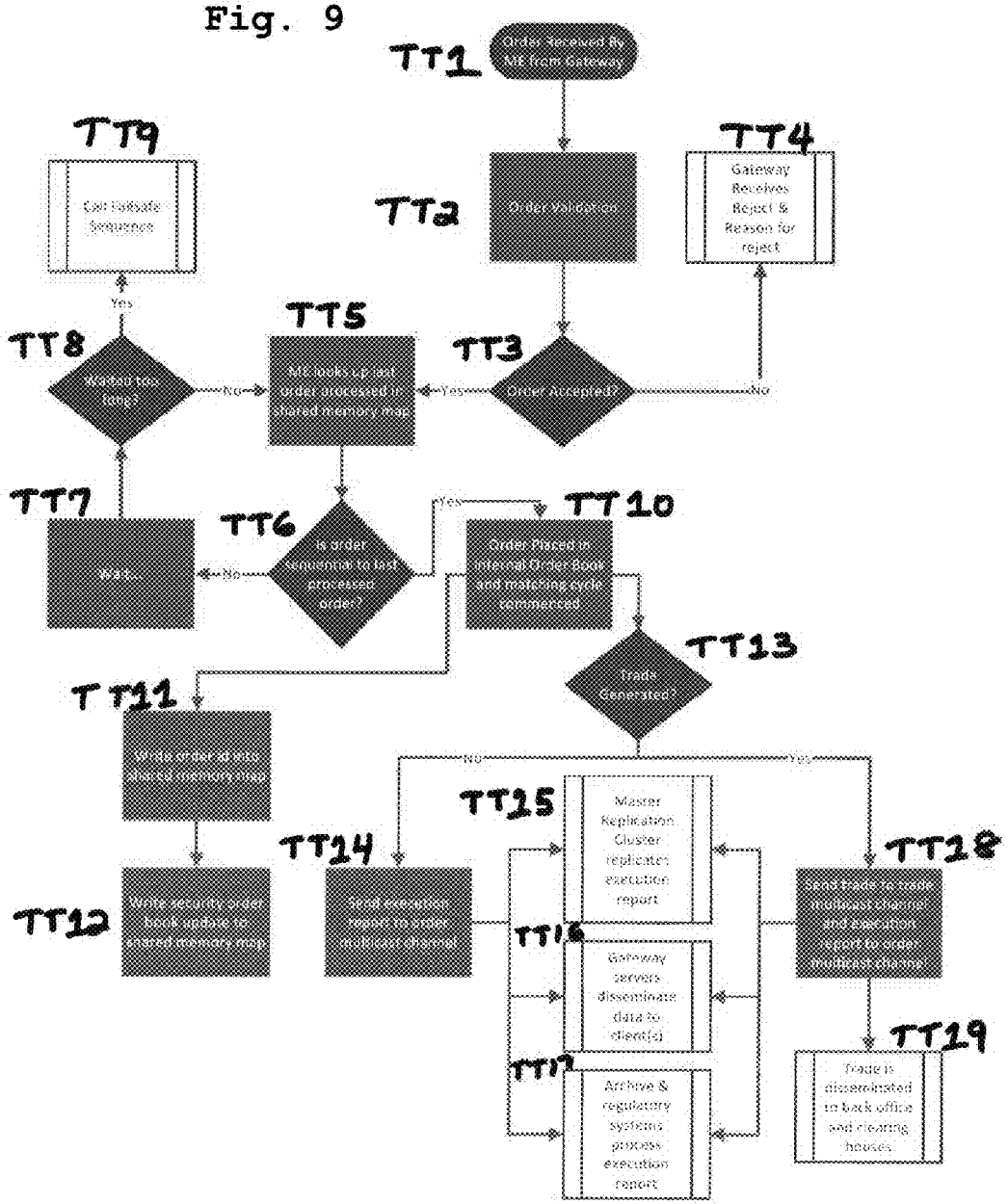
FIG. 9 is a process flow diagram illustrating a process flow for an order received by a transaction engine from the gateway, according to an aspect of the present disclosure.
Figure 12:
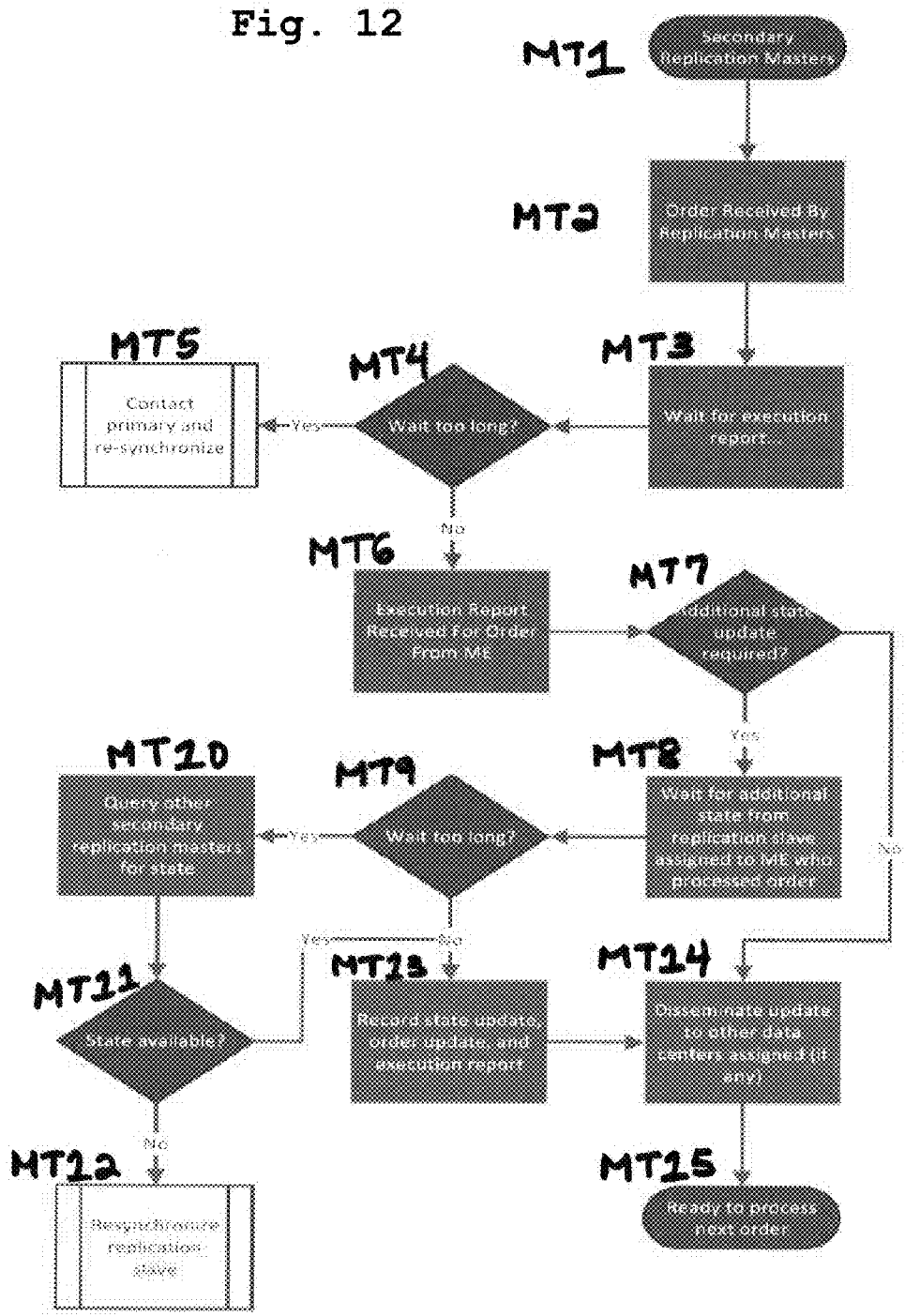
FIG. 12 is a process flow diagram illustrating a process flow for a secondary master when an order is received, according to an aspect of the present disclosure.
Figure 15A:
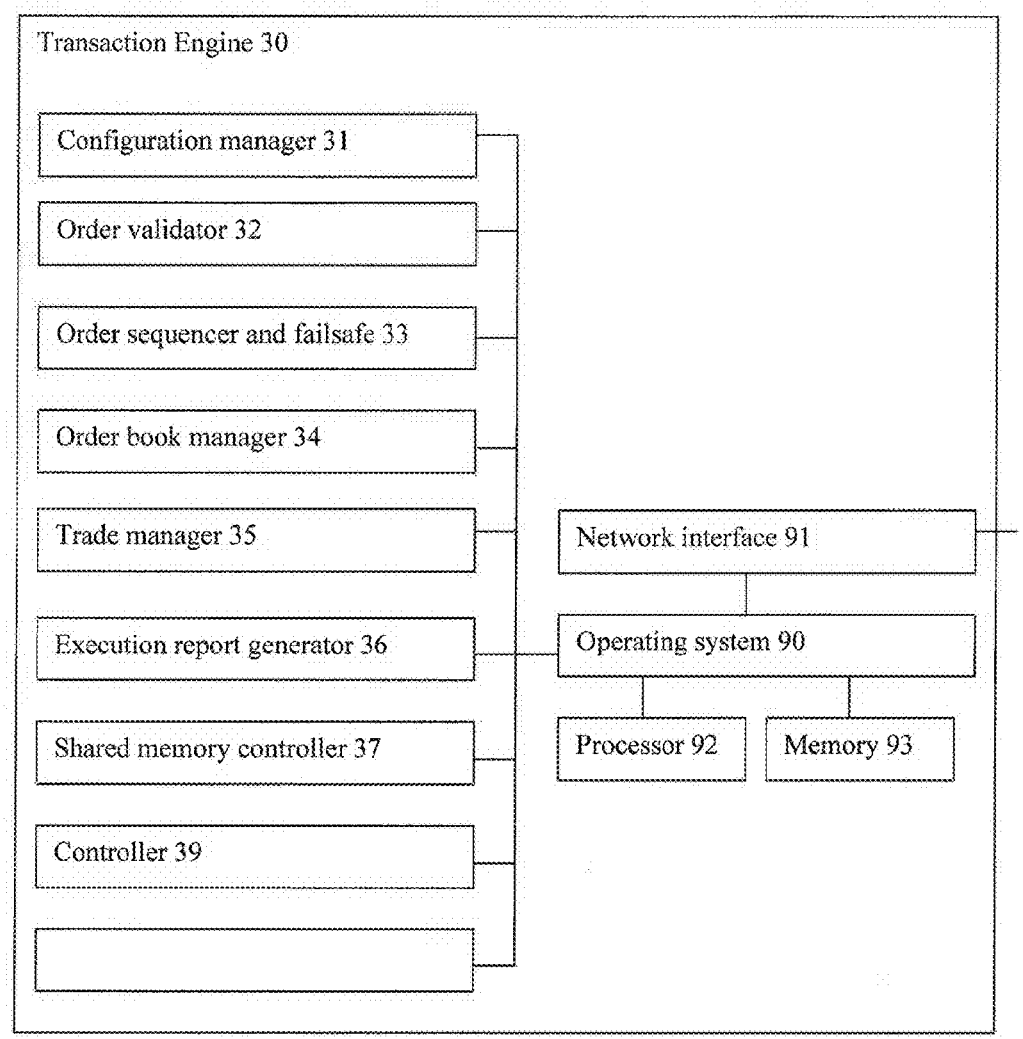
FIG. 15A is a schematic illustration illustrating an example of a transaction engine that processes an order, according to an aspect of the present disclosure.

According to the communication from gateway 20, transaction engine 1 (30) receives the order, as illustrated in FIGS. 9 and 14. The validity of the order is determined at TT2 shown in FIG. 9 and if it is valid, transaction engine 1 (30) determines whether the order is in sequence. FIG. 15A illustrates transaction engine 30, which includes order validator 32 for validating the order, an order sequence and failsafe 33 for checking the sequence of the order and controlling the failsafe process. If the order is out of sequence, transaction engine 1 (30) may wait, as illustrated at TT7 of FIG. 19, for further orders to be received. If the waiting period times out, as illustrated at TT8, then at TT9 transaction engine 1 (30) may enter a failsafe mode and request that the master supply the missing sequence of orders.

If the order is in sequence, transaction engine 1 (30), places the order in its order book, matches the order as illustrated at TT10, and executes the trade, if, according to the order, a trade is to be performed. A transaction engine may also be configured to process transactions for more than one order book, and/or more than one transaction engine may handle processing of transactions for the same order book. Upon execution of the trade, as shown at TT14 of FIG. 9, an execution report is transmitted to each memory slave, with the possible exception of memory slave controller 1 (40), and the order ID is written in a local shared memory map and the order book is updated as shown at TT11 and TT12, respectively.

Figure 15B:
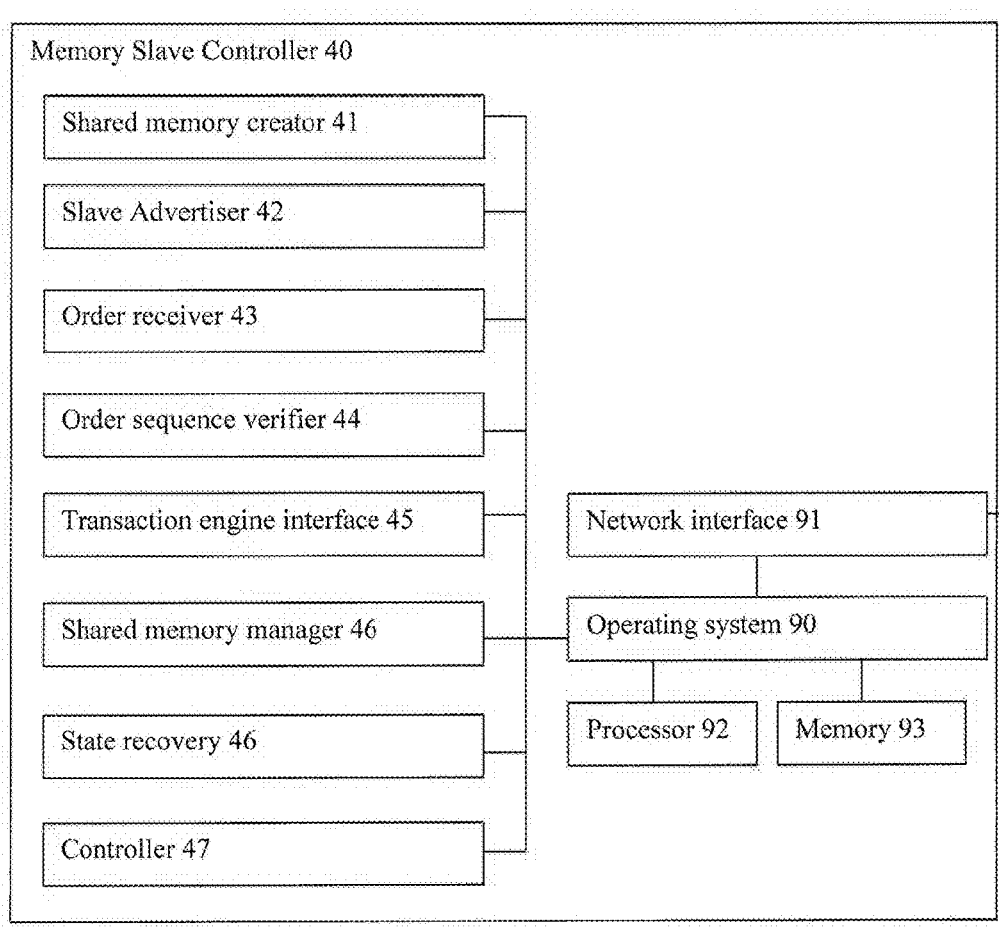
FIG. 15B is a schematic illustration of an example of a memory slave controller coupled to the transaction engine illustrated in FIG. 15A, according to an aspect of the present disclosure.

FIG. 15B illustrates major components of memory slave controller 40. Processing by memory slave controller 2 (60), that is, by all memory slave controllers other than memory slave controller 1 (40) associated with the transaction engine 1 (30) to which the order directly pertains by topic or channel, is illustrated in FIGS. 11 and 14. Upon receipt of an order from gateway 20 during the transaction processing, as further illustrated in FIGS. 11 and 14, memory slave controller 2 (60) the sequence of the order is checked in the shared memory map, as illustrated at ST2 of FIG. 11. If the order is out of sequence, then a recovery mode is entered. At ST3, if it is determined that this order has not been previously received, then at ST4 memory slave controller 2 waits for confirmation from the relevant transaction engine, for example, transaction engine 1 (30). The confirmation may include an order ID, the trade that was generated, and other information about the order and/or the trade. For example, the identity of the person, institution or party transmitting the transaction or order, the counterparty with which the transaction was matched (that is, for example, the buyer of a "sell" order), the security concerned, the market, the order or trade quantity, the time at which the order was transmitted and received, the type of trade, for example, limit order or the like, a dollar value of the trade, and other such information.

Memory slave 2 (60) may write the order ID into the shared memory resource using the shared memory map, and update an order book, as illustrated, at ST7-ST9 of FIG. 11. In this way, memory slave controllers 60 that do not share a common memory resource with the transaction engines that processed the order update the respective shared memory resource to reflect the updated credit limit information or other credit information.

At ST9, memory slave controllers 2 update the order books, if the memory slave controller and the corresponding transaction engine is configured as a backup to another transaction engine. In this type of scenario, a transaction engine that is processing orders for a given set of securities (or other types of transactions), has a backup transaction engine that will have a mirror of a securities order book and the credit state. Thus, if the primary transaction engine for this type of transaction is defective, inoperative or is otherwise not online, the backup transaction engine becomes the primary transaction engine for this type of security (or other class of transactions) and continues where the primary transaction engine left off. On the other hand, if the memory slave controller is not assigned to a transaction engine that is running as a backup to another transaction engine, then ST9 may be omitted for the memory slave controller.

When the order is received by a memory slave associated with the transaction engine that executed the trade or process the order, that is, for example, when memory slave controller 1 (40) receives the order execution confirmation from transaction engine 1 (30), as illustrated in S'T1 of FIG. 10 and in FIG. 14, memory slave controller 1 (40), may look up the most recent order processed in the shared memory, according to the shared memory map (FIG. 10, S'T2).

If the order is sequential, then as shown at S'T6, no further processing may be required, since the transaction engine has already updated the shared memory resource according to the shared memory map for this order, and thus, the credit information, including credit limits and the like, are up to date. If the order is out of sequence, then as shown at S'T4, memory slave controller 1 (40) may contact a master and as shown at S'T5, the state is corrected by loading the corrected information into the shared memory.

A process for memory master 70 will now be described with reference to FIGS. 6, 13 and 14. Memory master 70 may be a process running on a separate device, such as a server, or may share the device with gateway 20 or with transaction engine 30 with one or more secondary memory masters, or the like.

Figure 6:
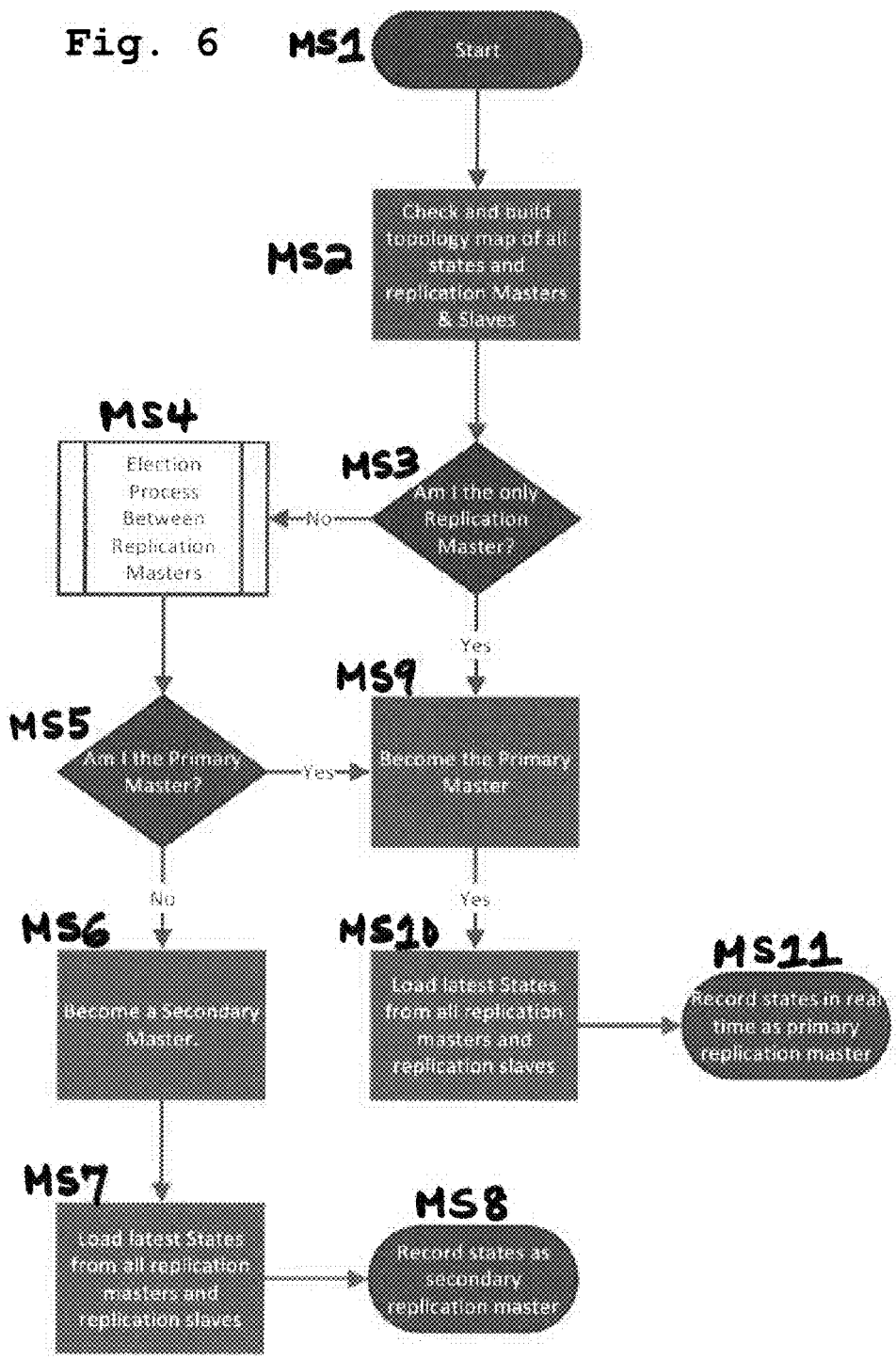
FIG. 6 is a process flow diagram illustrating an example of a startup process for a master replication flow, according to an aspect of the present disclosure.

At startup, memory master 70 builds a topology map of states of the units, including the transaction engines and memory slave controllers that are available as illustrated in MS2 of FIG. 6. At MS3, memory master 70 determines whether it is the only master on the system and, if so, moves to MS9. It there are no primary masters on the system, then an election process for determining the primary memory master is entered, as illustrated in MS4. If pursuant to this process, the memory master is not the primary memory master, then at MS6, it assumes the role of the secondary memory master (becomes the master). At MS7, it then loads the latest states from all replication memory masters and memory slave controllers 70. These states are recorded at MS8. On the other hand, if this memory master is the primary memory master, then states from the other masters and the memory slave controllers are loaded into memory and the states are recorded in real time, as shown at MS10 and MS11, respectively of FIG. 6. Then, memory master 70 may become the primary master, and load the latest states from the previous primary credit master.

Figure 13:
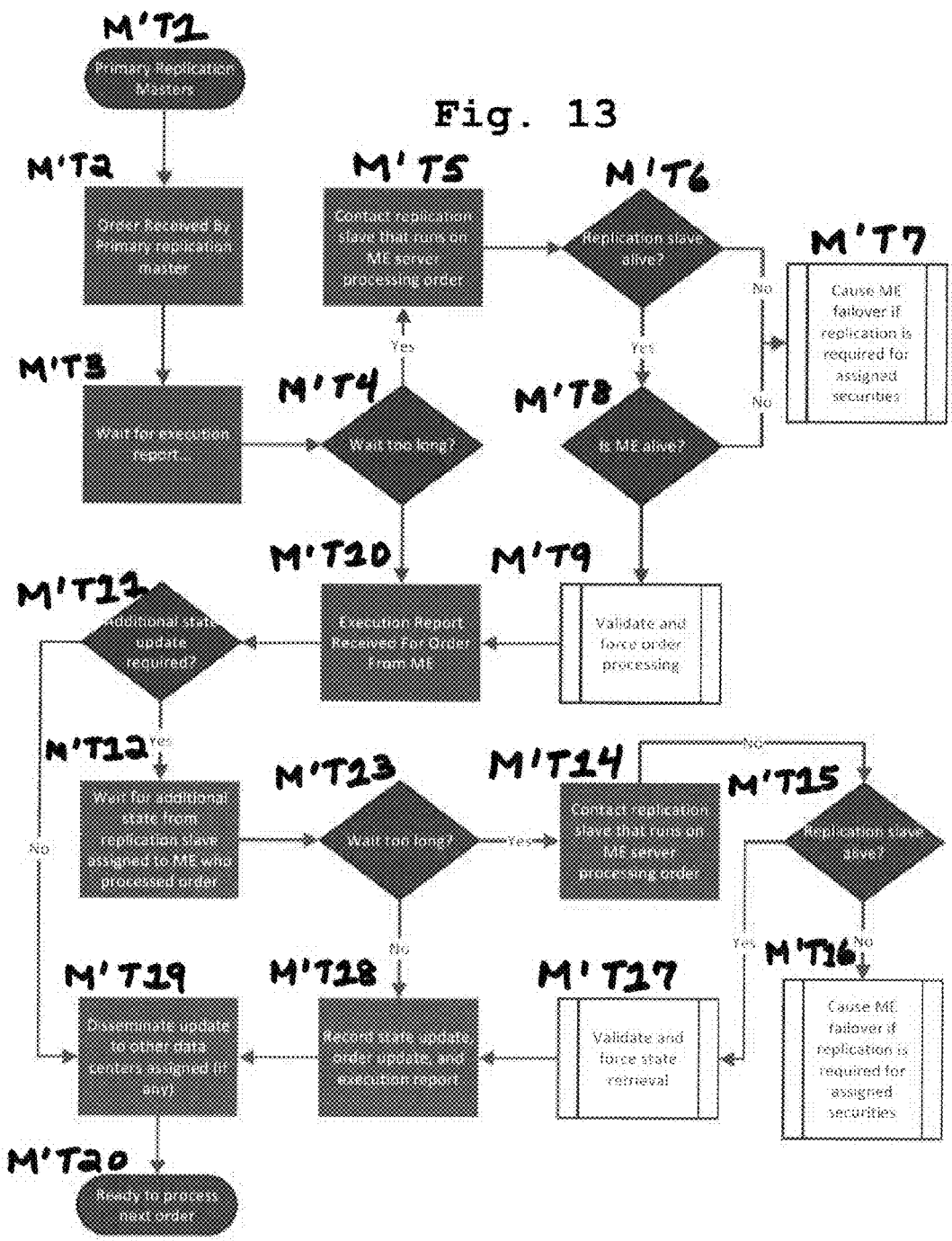
FIG. 13 is a process flow diagram illustrating an example of a process flow for a primary replication master process when an order is received, according to an aspect of the present disclosure.

At transaction processing, memory master 70 waits for an order to be received, as shown at M'T2 shown in FIG. 13. Then, at M'T3, the memory master 70 waits for an execution report to be received from transaction engine 1 (30). If the wait for the execution report takes too long, then memory master 70 may take remedial action. For example, as illustrated in FIG. 13 at M'T5, the remedial action may include contacting the memory slave controller 1 (40) that runs on the transaction engine server that is processing the order or is associated with this transaction engine to determine whether the memory slave controller is working properly. If it is working properly, then memory master 70 may further query whether the transaction engine 1 (30) is alive, that is, working properly or whether processing has stopped. If the transaction engine 1 (30) associated with the processing of the order is "alive," then the order may be validated and the order processing may be forced.

At M'T9, the validation may take the form of querying a monitor system hooked into the transaction engine to determine the "health" of the transaction engine. For example, queue sizes, rate of processing, ordered in queue, execution report queues waiting to be sent out, and other such information may be used to determine the health or good functioning of the transaction engine. Any replication master or memory slave may be able to tap into such a monitoring system to validate the health of the transaction engine. The transaction engine may have one or more mechanisms (for example, APIs) that are programmed for the replication master or memory slave to force queue processing or to recycle/refresh the internal processing thread of the transaction engine. These may be triggered based on the health of the transaction engine, as determined, for example, as described above.

The replication master may be designed to determine the health of the transaction engine and, if a failure is detected either for hardware of the server on which the transaction engine is running or within software of the transaction engine, replication master may trigger the platform to failover. Two such scenarios are described in detail, however, it will be understood that other scenarios are also contemplated:

Scenario 1: If a backup transaction engine for a given set of security is provided for, the failed transaction engine then:

1) The primary transaction engine is shut down. This may be done using the API mechanism on the transaction engine. If these are not responsive, memory slave can kill the transaction engine process. If there is hardware failure that is causing the failover, this may be skipped if the transaction engine is already down.

2) The backup transaction engine, that is, the transaction engine that is assigned as a backup to the primary transaction engine assigned to a given set of securities or other types of transactions, is notified that the backup transaction engine is now the primary transaction engine for this type of transaction.

3) Gateway and other components within the platform may be notified that the transaction engine processing this specific group of securities (or other type of transactions or the like), is now located on the new (backup) transaction engine.

4) The gateway validates if there are missing any execution reports for a specific transaction and notifies the primary transaction engine.

5) The new primary transaction engine may determine if it is missing any sequences and may request such missing sequences from the memory slave, replication master/secondary and/or the gateway.

Scenario 2: If there is NO backup transaction engine for processing the securities of the failed transaction engine is provided:

1) The primary transaction engine may be shut down. This may be done using the API mechanism on the transaction engine. If this is not responsive, memory slave can kill the transaction engine process. If there is a hardware failure causing failover, this may be skipped as the transaction engine is already down.

2) Gateway and/or other components within the platform may be notified if the transaction engine processing the specific securities is down or inoperative or offline.

3) Gateway and/or other components may indicate a failure has occurred for the set of securities or other types of transactions processed by the failed primary matching engine and cannot accept any orders for them.

Otherwise, when the execution report is received from transaction engine 1 (30) at M'T10, other data centers, if any, may be updated with the processing and optionally, with the updated credit information, and the update is recorded in a local memory or a memory associated with credit master 70, as shown at M'T18 and M'T19 of FIG. 13.

Additional memory masters may be provided as secondary memory masters, which receive all orders and execution reports and serve as redundant backup units in case the primary memory master 70 fails or is unresponsive.

At M'T10, if in case the wait for the additional state information at M'T9 is too long, other secondary replication masters may be contacted to retrieve state information. This may be done to avoid additionally burdening resources of the primary replication master, however, it will be understood that the state can also be retrieved from the primary replication master. Similarly at M'T5, such data may also be retrieved from the secondary replication masters, instead of from the primary replication master.

At M'T10, the memory slave controller may send the state to the secondary replication masters by way of example, so the other secondary replication master may be queried to retrieve the state, if the state was missed or damaged. As a general rule, if a primary replication master sends any communication to the secondary replication master, and for some reason the secondary replication master cannot process this information, then the secondary replication master may try to retrieve the information again from the primary replication master. In this way, a flexible system may be achieved in which any replication masters may retrieve state from any other replication masters, primary or secondary. Resynchronization requests may be distributed so as not to prevent burdening to the extent possible resources of any specific node.

The primary master election process may be weight based. The election process may involve two parts: First, a configuration parameter within each of the replication masters may be used to provide a weight value. This weight value may be a numeric value and the replication master with the highest such value may always become the primary replication master. If more than one replication master has the highest configured weight value, then an algorithm may be used to analyze the capacity of the server on which the replication master is running to provide one or more additional weight values for the election based on the CPU type, frequency, number of cores, cache size, RAM type, frequency, RAM availability, and other such hardware-related checks to determine the available capacity of the unit.

Transaction engines other than the transaction engine that is concerned with processing the order in the order book, according to the topic or channel of the transaction engine, need not be updated on the existence of the order, the execution report or the updated credit information because the memory slave controller associated with and sharing a common memory with each of the remaining transaction engines are sent an execution report by the relevant order-processing transaction engine, so that these remaining controllers can update their shared memories with the relevant credit information and other information.

The present method means for implementing the method, device, system, non-transitory computer-readable medium product, or the like may be implemented using hardware, software, firmware or a combination of the foregoing, and may be implemented in one or more computer systems or other processing systems, such that no human operation may be necessary. That is, the methods and functions can be performed entirely automatically through machine operations, but need not be entirely performed by machines. A computer or computer systems that implement the gateway, the plurality of transaction engines, the plurality of memory slave controllers, and the one or more memory masters as described herein may each include or be provided as one or more processors in one or more units for performing the method according to the present disclosure. One or more or all of these computers or processors may be located in a cloud or may be provided in a local enterprise setting or off premises at a third party contractor. Two or more of these units, or components of these units, may be executed on, or be performed by, processes running on a single device or on a series of such devices, for example as one or more racks of devices. The communication interface with the gateway or with other components herein described may include a wired or wireless interface communicating via a TCP/IP paradigm or other types of protocols, and may communicate via a wire, cable, fire optics, a telephone line, a cellular link, a radio frequency link, such as WI-FI or Bluetooth, a LAN, a WAN, VPN, or other such communication channels and networks, or via a combination of the foregoing.

The present method and system improve the functioning of the computer or computer system latency caused by locking of the computer memory resource needed by more than one transaction performed by competing processes can be reduced or mitigated. Also, temporary blocking of the computer memory resource may be eliminated or alleviated by the method and system as described herein, since each node or unit may have its own shared memory that includes a version of the necessary information, such as the credit limit information.

Although the present invention has been described in relation to particular embodiments thereof, many other variations and modifications and other uses will become apparent to those skilled in the art. Steps outlined in sequence need not necessarily be performed in sequence, not all steps need necessarily be executed and other intervening steps may be inserted. It is preferred, therefore, that the present invention be limited not by the specific disclosure herein.

What is claimed is:

1. A method of updating a first computer memory of a first transaction engine configured to process transactions of a first topic and a second computer memory of a second transaction engine configured to process transactions of a second topic different from the first topic, the method comprising:
   receiving, by an order processor of the first transaction engine, a first transaction request of the first topic, processing, by the order processor of the first transaction engine, the first transaction request to yield a processed first transaction and, based on the processed first transaction, updating, by the order processor of the first transaction engine, the first computer memory, according to a first shared computer memory map of the first computer memory;
   receiving, by a memory slave controller of the second transaction engine, the first transaction request, waiting, by the memory slave controller of the second transaction engine, for receipt of confirmation of the processed first transaction from the order processor of the first transaction engine, and updating, by the memory slave controller of the second transaction engine, according to the processed first transaction, the second computer memory, according to a second shared computer memory map of the second computer memory;
   receiving, by an order processor of the second transaction engine, a second transaction request of the second topic, processing, by the order processor of the second transaction engine, the second transaction request to yield a processed second transaction and, based on the processed second transaction, updating, by the order processor of the second transaction engine, the second computer memory, according to the second shared computer memory map of the second computer memory;
   receiving, by a memory slave controller of the first transaction engine, the second transaction request, waiting, by the memory slave controller of the first transaction engine, for receipt of confirmation of the processed second transaction received from the order processor of the second transaction engine, and updating, by the memory slave controller of the first transaction engine, according to the processed second transaction, the first computer memory, according to the first shared computer memory map of the first computer memory.

2. The method of claim 1, wherein the first transaction engine is implemented on a first automated data processor, and the second transaction engine is implemented on a second automated data processor different from the first automated data processor.

3. The method of claim 1, wherein the memory slave controller of the first transaction engine provides no direct notification to the order processor of the first transaction engine regarding the update to the first computer memory, and
   the memory slave controller of the second transaction engine provides no direct notification to the order processor of the second transaction engine regarding the update to the second computer memory.

4. The method of claim 1, further comprising, prior to performing other recited steps:
   generating, by a configuration manager of the first transaction engine, the first shared computer memory map of the first computer memory;
   generating, by a configuration manager of the second transaction engine, the second shared computer memory map of the second computer memory.

5. The method of claim 1, further comprising, prior to performing other recited steps:
   generating, by the memory slave controller of the first transaction engine, the first shared computer memory map of the first computer memory;
   generating, by the memory slave controller of the second transaction engine, the second shared computer memory map of the second computer memory.

6. The method of claim 1, wherein the confirmation of the processed first transaction comprises an order ID associated with the first transaction request and trade data associated with the confirmation of the processed first transaction.

7. The method of claim 1, further comprising:
   based on the processed first transaction, transmitting, by the order processor of the first transaction engine, an execution report, to a plurality of memory slave controllers.

8. The method of claim 1, further comprising:
   receiving, by a gateway processor, the first and second transaction requests;
   first identifying the first transaction request as being associated with the first topic;
   according to the identifying, transmitting the first transaction request to the order processor of the first transaction processor;
   transmitting the first transmission request to a plurality of memory slave controllers including the memory slave controller of the second transaction engine;
   identifying the second transaction request as being associated with the second topic;
   according to the second identifying, transmitting the second transaction request to the order processor of the second transaction processor; and transmitting the second transmission request to the plurality of memory slave controllers including the memory slave controller of the first transaction engine.

9. The method of claim 8, further comprising:
transmitting the first transmission request to a memory master processor; and
transmitting the second transmission request to the memory master processor,
wherein the first transaction engine is implemented on a first automated data processor, the second transaction engine is implemented on a second automated data processor different from the first automated data processor, and the memory master processor is implemented on a third automated data processor different from the first and second automated data processors.

10. The method of claim 9, further comprising:
receiving, by the memory master processor, the first and second transmission requests;
updating a master memory, by the memory master processor, according to the confirmation of the processed first transaction received from the order processor of the first transaction engine and the confirmation of the processed second transaction received from the order processor of the second transaction engine.

11. A system configured to update a first computer memory of a first transaction engine configured to process transactions of a first topic and a second computer memory of a second transaction engine configured to process transactions of a second topic different from the first topic, the system comprising:
the first transaction engine implemented on a first automated data processor and comprising:
an order processor configured to receive a first transaction request of the first topic, and to process the first transaction request to yield a processed first transaction;
a shared memory controller configured to update, based on the processed first transaction, the first computer memory, according to a first shared computer memory map of the first computer memory; and
an execution report generator configured to transmit, based on the processed first transaction, an execution report, to a plurality of memory slave controllers including the memory slave controller of the second transaction engine;
a memory slave controller of the second transaction engine comprising:
an order receiver configured to receive the first transaction request;
a transaction engine interface configured to wait for receipt of confirmation of the processed first transaction from the order processor of the first transaction engine; and
a shared memory manager configured to update, according to the processed first transaction, the second computer memory, according to a second shared computer memory map of the second computer memory;
the second transaction engine implemented on a second automated data processor different from the first automated data processor and comprising:
an order processor configured to receive a second transaction request of the second topic, and to process the second transaction request to yield a processed second transaction;
a shared memory controller configured to update, based on the processed second transaction, the second computer memory, according to the second shared computer memory map of the second computer memory; and
the first transaction engine comprising:
a memory slave controller configured to receive the second transaction request;
a transaction engine interface configured to wait for receipt of confirmation of the processed second transaction received from the second transaction engine; and
a shared memory manager configured to update, according to the processed second transaction, the first computer memory, according to the first shared computer memory map of the first computer memory.

12. The system of claim 11, wherein the memory slave controller of the first transaction engine provides no direct notification to the order processor of the first transaction engine regarding the update to the first computer memory, and
the memory slave controller of the second transaction engine provides no direct notification to the order processor of the second transaction engine regarding the update to the second computer memory.

13. The system of claim 11, wherein the first transaction engine further comprises:
a configuration manager configured to generate, prior to receiving a transaction request by the first transaction engine, the first shared computer memory map of the first computer memory; and
the second transaction engine further comprises:
a configuration manager configured to generate, prior to receiving a transaction request by the second transaction engine, the second shared computer memory map of the second computer memory.

14. The system of claim 11, wherein the memory slave controller of the first transaction engine further comprises a shared memory creator configured to generate, prior to receiving a transaction request, the first shared computer memory map of the first computer memory; and
the memory slave controller of the second transaction engine further comprises a shared memory creator configured to generate, prior to receiving a transaction request, the second shared computer memory map of the second computer memory.

15. The system of claim 11, wherein the confirmation of the processed first transaction comprises an order ID associated with the first transaction request and trade data associated with the confirmation of the processed first transaction.

16. The system of claim 11, wherein the first and second transaction requests are orders, and the processing of the first transaction request and the processing of the second transaction request each entail matching the requests in respective order books for an electronic exchange for market-traded items.

17. The system of claim 11, the second transaction engine further comprising:
an execution report generator configured to transmit, based on the processed second transaction, an execution report, to a plurality of memory slave controllers including the memory slave controller of the first transaction engine.

18. The system of claim 11, further comprising a gateway processor comprising:
an order validator configured to receive the first and second transaction requests;
a transaction topic processor configured to identify the first transaction request as being associated with the first topic and the second transaction request as being associated with the second topic;
a transaction engine interface configured to transmit, according to the identifying, the first transaction request to the first transaction processor and the second transaction request to the second transaction processor;
a slave and master broadcaster configured to transmit the first transmission request to a plurality of memory slave controllers including the memory slave controller of the second transaction engine; and
the slave and master broadcaster configured transmit the second transmission request to the plurality of memory slave controllers including the memory slave controller of the first transaction engine.

19. The system of claim 18, further comprising:
a memory master processor comprising a gateway interface configured to receive the first transaction request and the second transaction request;
a transaction engine interface configured to receive the confirmation of the processed first transaction and the confirmation of the second transaction; and
a controller configured to update a master memory according to the confirmation of the processed first transaction and the confirmation of the processed second transaction,
wherein the memory master processor is implemented on a third automated data processor different from the first and second automated data processors.

* * * * *